(12) United States Patent
Carpenter et al.

(10) Patent No.: US 6,390,525 B2
(45) Date of Patent: May 21, 2002

(54) VEHICLE EXTENSION SLIDE

(75) Inventors: Keith A. Carpenter; Steven Robinson, both of Medford, OR (US)

(73) Assignee: Innovative Fabworks

( * ) Notice: Subject to any disclaimer, the term of this patent is extended or adjusted under 35 U.S.C. 154(b) by 0 days.

(21) Appl. No.: 09/528,360

(22) Filed: Mar. 17, 2000

Related U.S. Application Data

(60) Provisional application No. 60/125,420, filed on Mar. 22, 1999.

(51) Int. Cl.$^7$ .............................................. B62D 33/077
(52) U.S. Cl. ................. 296/26.09; 296/26.13; 296/37.6
(58) Field of Search ................. 296/26.09, 26.08, 296/26.12, 26.13, 26.03, 37.6

(56) References Cited

U.S. PATENT DOCUMENTS

| | | | | |
|---|---|---|---|---|
| 2,545,269 A | * | 3/1951 | Ford | 296/26 |
| 3,447,826 A | * | 6/1969 | Gostomski | 296/26 |
| 4,020,957 A | | 5/1977 | Wren | 214/38 R |
| 4,475,760 A | | 10/1984 | Morgan | 296/26 |
| D291,789 S | | 9/1987 | Noga | D12/98 |
| 4,789,195 A | * | 12/1988 | Fletcher | 296/37.6 |
| 4,824,158 A | * | 4/1989 | Peters et al. | 296/37.6 |
| 4,856,840 A | * | 8/1989 | Hanley | 296/26.08 |
| 4,915,437 A | * | 4/1990 | Cherry | 296/37.6 |
| 4,932,703 A | | 6/1990 | Chamberlin et al. | 296/26 |
| 4,951,991 A | | 8/1990 | Haigler | 296/26 |
| 5,052,878 A | * | 10/1991 | Brockhaus | 296/37.6 X |
| 5,064,335 A | * | 11/1991 | Bergeron et al. | 296/26 X |
| 5,186,479 A | * | 2/1993 | Flowers | 280/47.35 |
| 5,419,639 A | | 5/1995 | Hobbs et al. | 384/18 |
| 5,501,500 A | | 3/1996 | Cannon | 296/26 |
| 5,513,941 A | * | 5/1996 | Kulas et al. | 296/26 X |
| 5,599,055 A | | 2/1997 | Brown | 296/39.2 |
| D380,707 S | | 7/1997 | Gallegus | D12/96 |
| 5,755,480 A | | 5/1998 | Bryan | 296/26 |
| 6,065,792 A | * | 5/2000 | Scillo et al. | 296/26.09 |
| 6,098,218 A | * | 8/2000 | Ventura | 5/113 |
| 6,120,075 A | * | 9/2000 | Terry | 296/26.09 |

* cited by examiner

*Primary Examiner*—Joseph D. Pape
*Assistant Examiner*—Lori L Coletta
(74) *Attorney, Agent, or Firm*—Blakely Sokoloff Taylor & Zafman LLP

(57) ABSTRACT

A bed slide for use in a vehicle storage area is designed to provide greater access to stored objects, requires no fasteners for mounting, and is easily removable. The bed slide is characterized by two detachable pieces, a bottom frame that stays stationary, and a top portion that slides forward and back along the bottom frame. The bottom frame is connected to the vehicle storage area by inserting the pegs of the bottom frame into holes in the vehicle storage.

17 Claims, 5 Drawing Sheets

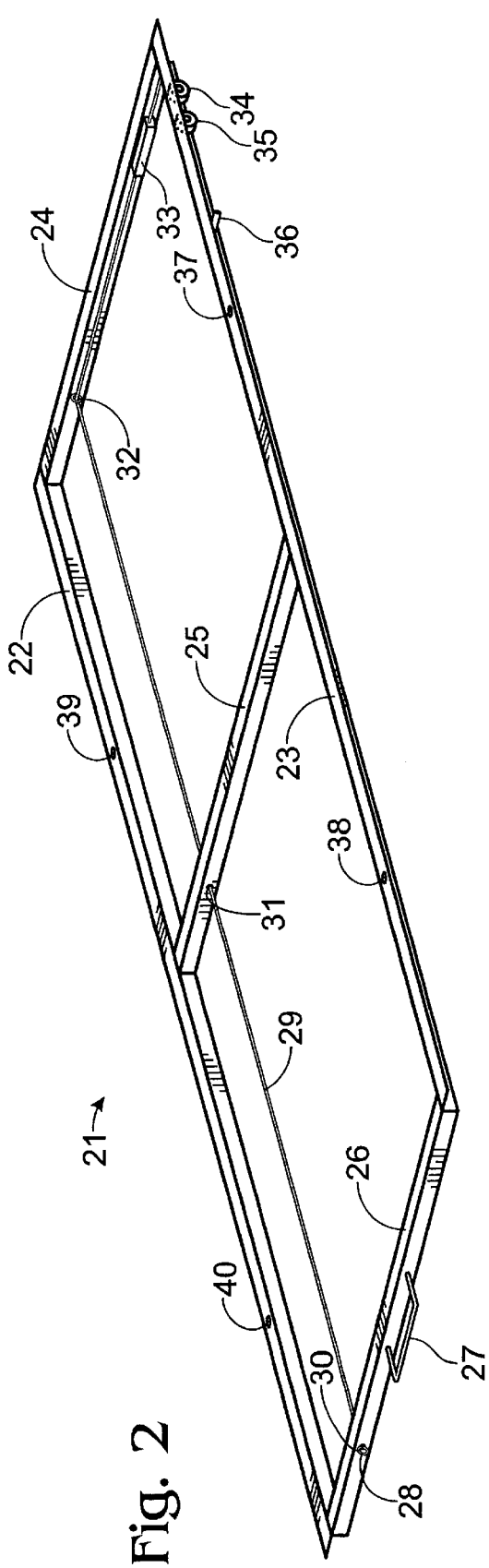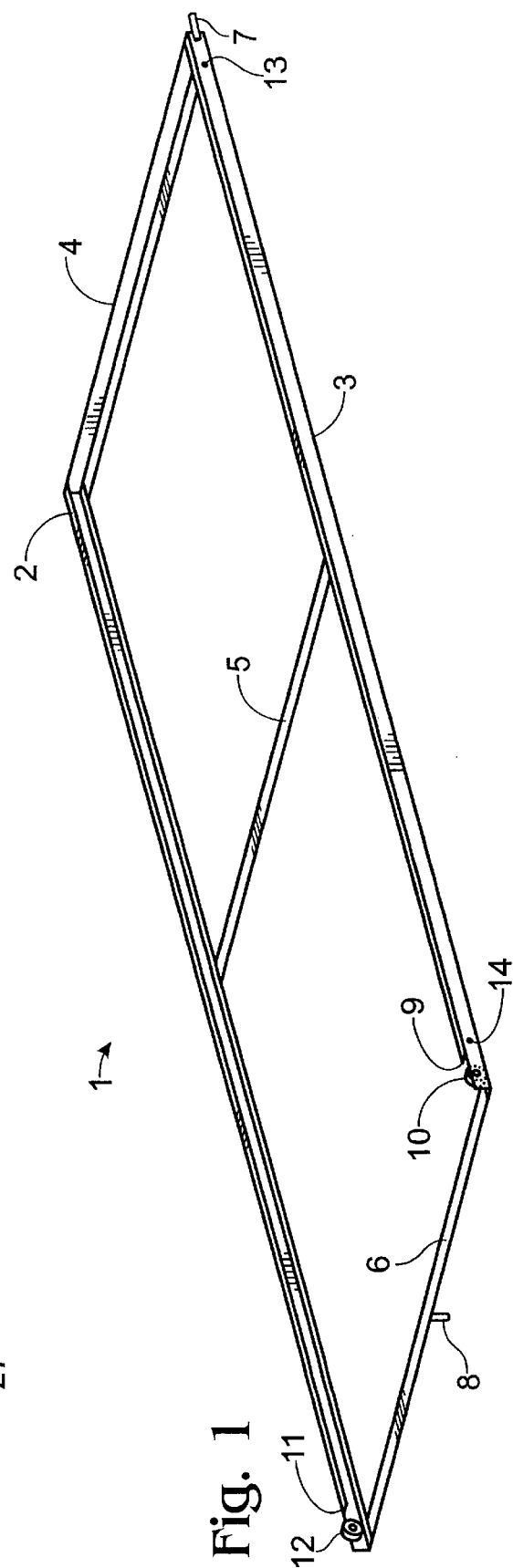

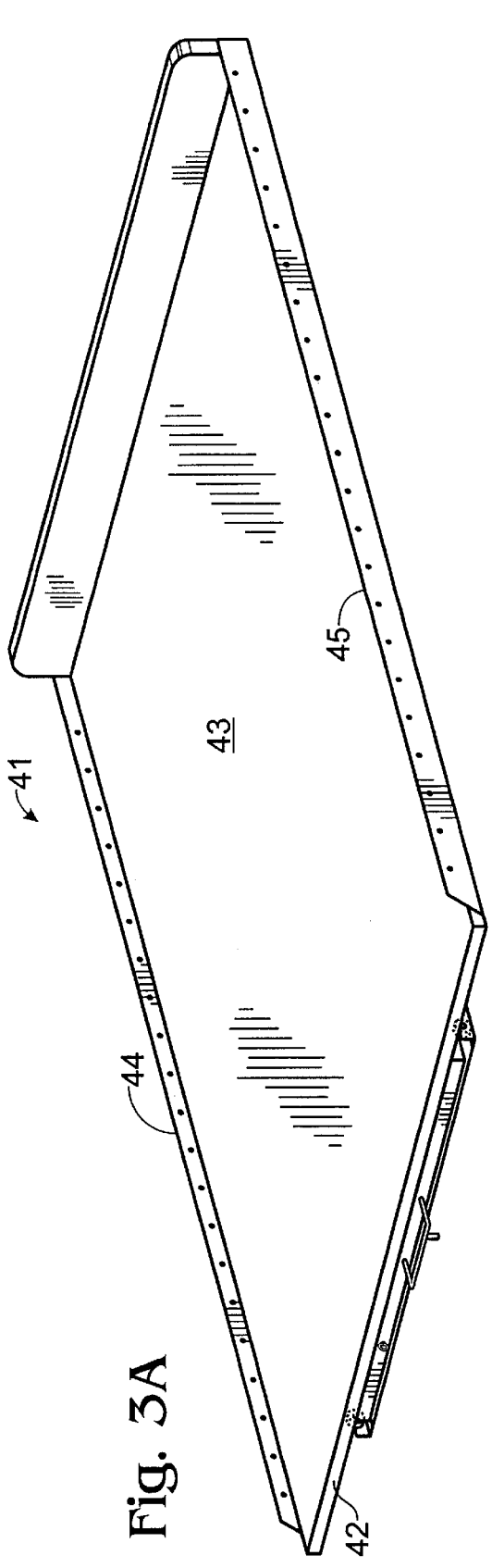
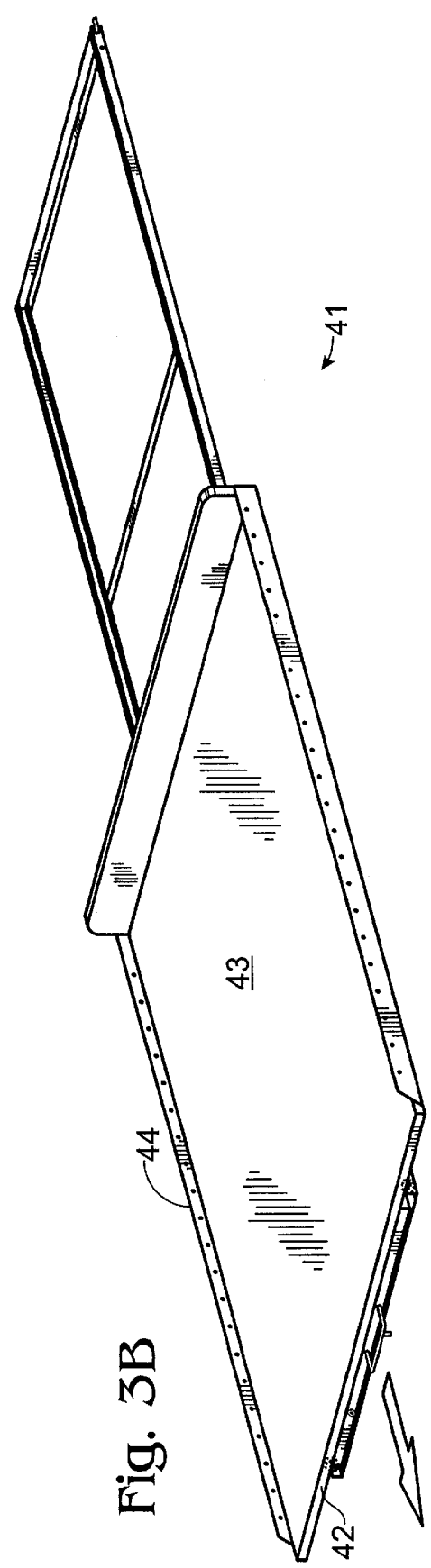
Fig. 3A
Fig. 3B

VEHICLE EXTENSION SLIDE

This U.S. patent application claims the benefit of U.S. Provisional Application No. 60/125,420, filed Mar. 22, 1999.

FIELD OF THE INVENTION

This invention relates to apparatus for improving access to vehicle storage areas and more particularly, to an apparatus to attach to a vehicle storage area having a portion that can slideably extend out of the storage area.

BACKGROUND OF THE INVENTION

Vehicles that are used for transporting equipment, supplies, or other items within enclosed areas such as, for example, a pickup truck with a canopy covering the bed or a motorhome having storage compartments under the living area, can hold more items than are easily accessible. For example, if a person fills a canopy covered pickup bed with tools, the tools near the tailgate are more easily accessible than tools near the front of the bed (e.g., behind the cab of the truck). Other types of storage areas associated with other types of vehicles suffer from similar shortcomings.

One solution to the problem of accessing items in storage areas is the use of a bed slide. However, current bed slides suffer from significant disadvantages. First, current bed slides either require fasteners for mounting and therefore are not easily removable from the storage area. This can be a disadvantage, for example, when the vehicle is used for many different purposes, some of which are assisted by the bed slide and others of which are not.

Using fasteners for mounting a bed slide has several disadvantages. The fasteners are typically difficult to reach during installation and removal. Further, fasteners tend loosen during use and may come undone leaving the bed slide improperly mounted. Thus, an improved bed slide is desirable.

SUMMARY OF THE INVENTION

An apparatus comprising a bottom frame to attach to a storage area of a vehicle a top portion slideably connected to the frame, wherein the bottom frame is attached to the storage area by peg portions of the bottom frame extending into corresponding holes in the storage area.

BRIEF DESCRIPTION OF THE DRAWINGS

The invention is illustrated by way of example, and not by way of limitation, in the figures of the accompanying drawings in which like reference numerals refer to similar elements.

FIG. 1 is a perspective view of one embodiment of a bottom frame for a bed slide.

FIG. 2 is a perspective view of one embodiment of a top portion for a bed slide.

FIG. 3A is a perspective view of one embodiment of a top platform for a bed slide with the bed slide fully contracted.

FIG. 3B is a perspective view of one embodiment of a top platform for a bed slide with the bed slide partially extended.

DETAILED DESCRIPTION

Figure 4:
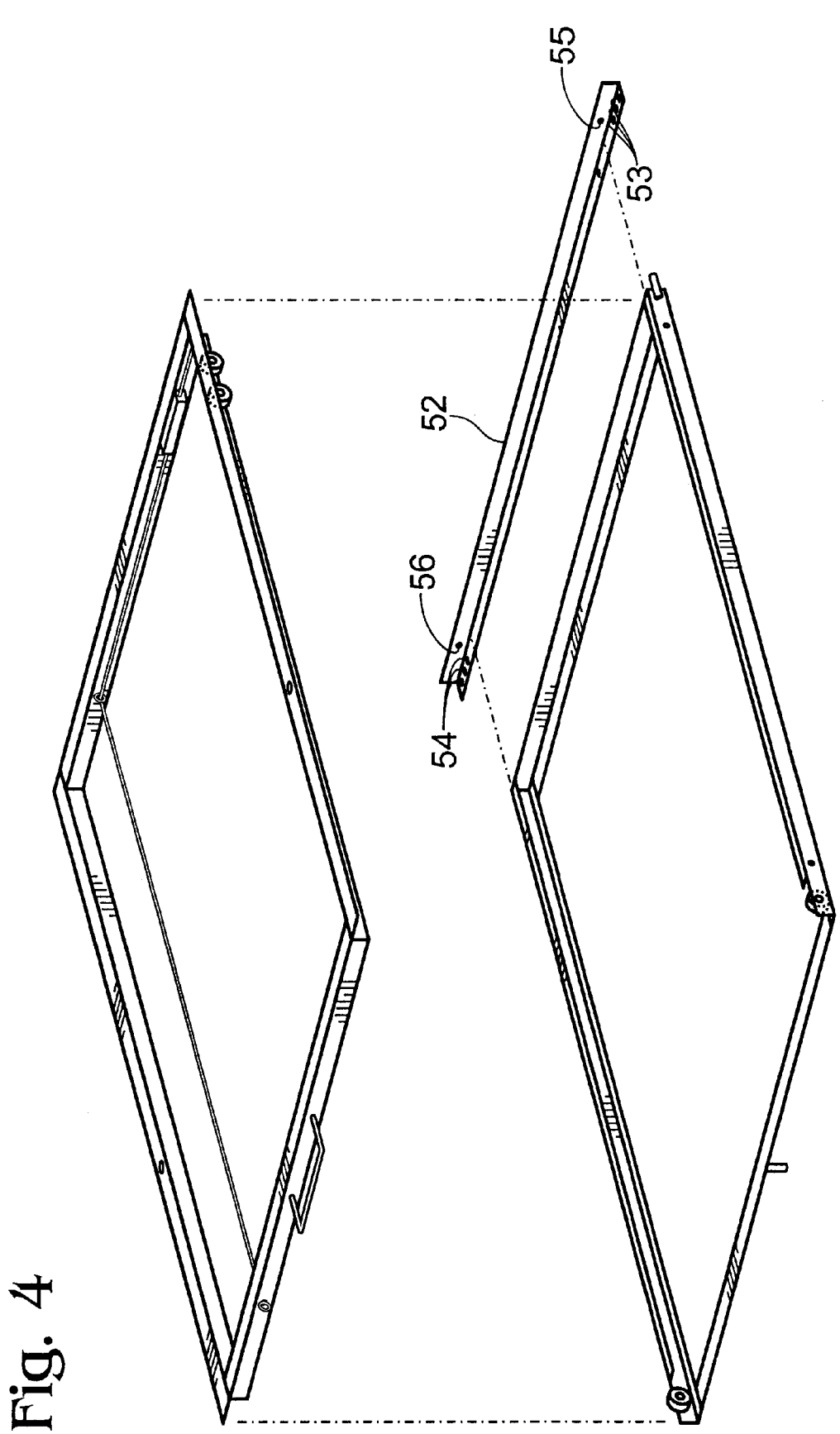
FIG. 4 is a perspective view of one embodiment of a bed slide for use on a vehicle with a fifth wheel, van, recreational vehicle (RV), sport utility vehicle (SUV), station wagon, or other vehicle.

Vehicle bed slides are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The bed slides described herein provide greater access to stored objects, requires no fasteners for mounting, and is easily removable. As an overview, referring initially to FIGS. 1 and 2, a bed slide having two detachable pieces, bottom frame 1 that attaches to the vehicle (not shown in FIGS. 1 and 2), and a top portion 21 that slides bottom frame 1. In one embodiment, bottom frame 1 is connected to the vehicle storage area (e.g., truck bed) by inserting the pegs 7 of the bottom frame into corresponding holes in the vehicle storage area. While the bed slides described herein are described as being constructed from angle iron, other suitable materials can also be used.

In one embodiment, the bed slide fits inside the full length of a truck bed between the wheel wells and allows access to the front of the bed by sliding the top portion back.

Other sizes can also be implemented for other truck bed sizes. In alternative embodiments, a bed slide can be configured to operate with a fifth wheel trailer hitch, a van, station wagon, recreational vehicles (RVs), or other vehicles. For storage compartments that have openings on opposite ends of the compartment two bed slides can be placed end to end facing opposite openings, or a first bed slide can have a second bed slide attached to the top portion of the first bed slide facing the opposite direction. Multiple tiered and telescoping bed slides can also be provided.

FIG. 1 is a perspective view of one embodiment of a bottom frame for a bed slide. Bottom frame 1 consists of two box channels 2 and 3 laid on edge running the length of the truck, which varies by the size of the truck bed. In one embodiment, the channels 2 and 3 are 32¼ inches long with angle iron 4 in the front and two straps 5 and 6, one centered and the other attached to the back connecting the channels. In one embodiment, at the outside front of each box channel there is a 3 inch by ½ inch round stock peg 7 welded to each side, with 1 inch overhang and 2 inch welded to the channel. Other peg sizes, positions, and attachment methods can also be used. In one embodiment, back flat strap 6 has a hole drilled in the center with a 1½ inch by ½ inch round stock peg 8 welded flush to the top leaving 1⅜ inch overhanging the bottom.

In one embodiment, each channel has a 4 inch cutback 9 and 11 on the back top horizontal portion of the channel, at these ends there is a 1½ inch hole drilled with a 1½ inch bearing 10 and 12 attached to the inside. In one embodiment, the right side channel has a ⅜ inch hole 13 drilled vertically center and approximately 3 inches from the front, there is an additional ²⁵⁄₆₄ inch hole 14 drilled vertically center approximately 12 inches from the back end. These holes accommodate a ⅜ inch round stock spring loaded pin that is used for the latching mechanism. In one embodiment, additional holes can be provided along the box channel so that the latching mechanism may engage the top portion in positions between full extension and full contraction.

In one embodiment, the bottom frame is attached to the truck bed by drilling two ½ inch holes in the front of the truck bed to accommodate the round stock peg that is welded to the front of each channel. One peg, or more than two pegs can also be used. These pegs may be placed in other positions. The pegs keep bottom frame 1 from moving upward as the top portion of the bed slide extends back. In one embodiment, there is an additional 1½ inch hole drilled in the back of the truck bed to accommodate the peg that is welded to back flat strap 6. Multiple pegs can also be used. These pegs may be placed in other positions. This keeps the bed slide from pulling out and from moving side to side. The bottom portion is then installed and detached by positioning the round stock pegs welded to the bottom frame into these holes.

FIG. 2 is a perspective view of one embodiment of a top portion for a bed slide.

In one embodiment, the top portion 21 consists of 3 inch by 2 inch by ¼ inch angle iron 22 and 23 with the 3 inch side laid flat to accommodate the top. These also run the length of the truck and vary by the size of the truck bed. In one embodiment, this section is 35⅝ inches wide with angle iron connecting these in the front 24, center 25, and back 26. On the back angle there is a ⅜ inch round stock handle bent and welded to the center 27.

In one embodiment, there is also a ring 28 attached to a ¹⁄₁₆ inch cable 29 that is run forward through holes 30 an 31, angled through an "I" bolt 32 attached to the front angle iron 24 to the latch mechanism 33. There are ½ inch holes drilled in the front 2 inches side of each 3 inch by 2 inch by ¼ inch angle iron. One hole is drilled approximately ¾ inches back from the front and the other is approximately 1½ inches back from the front with 1½ inch sealed bearings 34 and 35 attached. There are also two stops 36 welded to the 2 inch portion of this angle, one on each side approximately 12 inches back from the front.

When the top portion is slideably attached to the bottom frame, these sealed bearings and stops are located below the top lips of the box channels. The bearings engage the top portion to the bottom frame and the stops keep the top portion from over extending as it is being pulled back. Other configurations for slideably attaching top portion 21 to bottom frame 1 can also be used. On the 3 inch topside of these angles there are holes 37–40 drilled to accommodate the screws that will attach the top platform. Any number of holes can be provided.

FIG. 3A is a perspective view of one embodiment of a top platform for a bed slide with the bed slide fully contracted. FIG. 3B is a perspective view of one embodiment of a top platform for a bed slide with the bed slide partially extended. In one embodiment, the top platform 41 consists of a ⅝ inch sheet of plywood 42 with a carpeted top 43 and steel angle iron on the sides 44 and 45. Other platform tops can also be provided, for example, metal with a rubber or rubberized top layer, or other materials or combinations of materials.

The top portion is installed and detached from the bottom stationary portion by sliding it back to the stops and lifting up. Then the top is removed by sliding it back a few more inches until the bearings on this section meet the bearings on the bottom stationary section and lifting.

FIG. 4 is a perspective view of one embodiment of a bed slide for use on a vehicle with a fifth wheel, van, recreational vehicle (RV), sport utility vehicle (SUV), station wagon, or other vehicle. The bed slide is described with reference to a fifth wheel configuration; however, the bed slide can be used in other vehicles and/or configurations. In one embodiment, the bottom frame is attached to the fifth wheel truck bed by drilling holes in the bottom of the bed at the back end of the fifth wheel mount to accommodate fasteners to attach angle iron 52 to the bottom of the fifth wheel truck bed. Holes 53 and 54 drilled into the bottom side of angle iron 52 to accommodate fasteners to attach angle iron 52 to the bottom of the fifth wheel truck bed.

The bottom frame is attached to the fifth wheel truck bed truck bed by drilling two ½ inch holes 55 and 56 in the vertical side of angle iron 52 to accommodate the round stock peg that is welded to the front of each channel. One peg, or more than two pegs could also be used. These pegs may be placed in other positions. This keeps the bottom frame from moving upward as the top portion of the bed slide extends back. In one embodiment, there is an additional ½ inch hole drilled in the back center of the angle iron 52 to accommodate the peg that is welded to the back flat strap. Multiple pegs can also be used. These pegs may be placed in other positions. This keeps the bed slide from pulling out and from moving side to side. The bottom portion is then installed and detached by positioning the round stock pegs welded to the bottom frame into these holes. This or a similar configuration can be used in different vehicles including, but not limited to, vans, RVs, SUVs, station wagons, etc.

Figure 5:
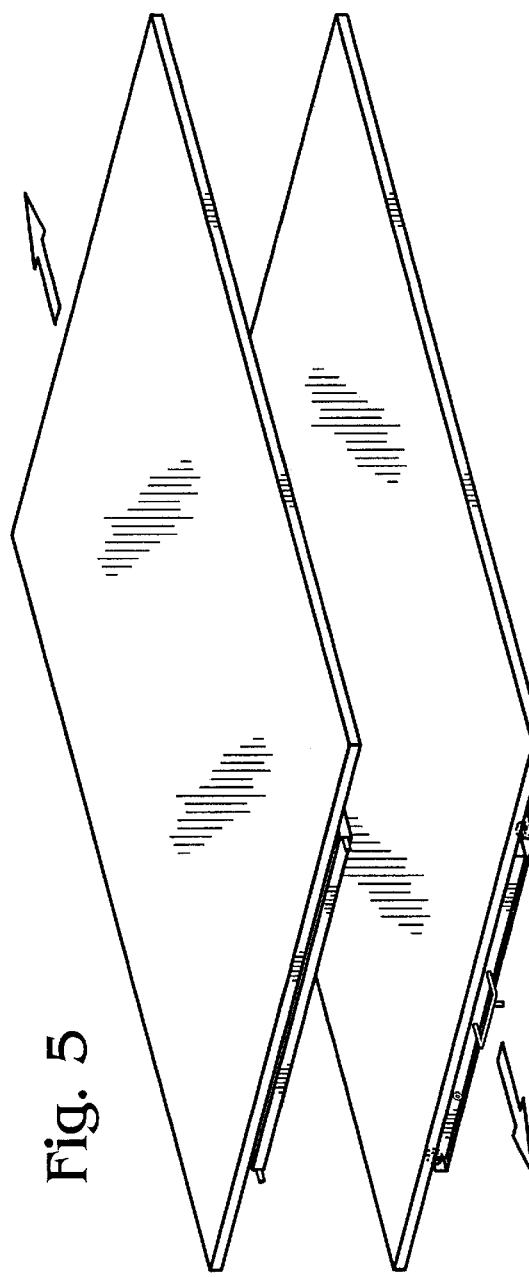
FIG. 5 is a perspective view of one embodiment of a bed slide where two bed slides are place atop each other facing opposite directions.

FIG. 5 is a perspective view of one embodiment of a bed slide where two bed slides are place atop each other facing opposite directions. In another embodiment, storage compartments that have two openings at opposite ends of the storage compartment, the bed slide can be configured to slide out either side of the compartment.

In one embodiment, a second bed slide my be positioned atop a first bed slide so that the second bed slide faces the opposite direction with respect to the first bed slide. This alternative embodiment could thus be slideable in two directions and provide access to either side of a storage compartment with openings at two opposite ends.

Figure 6:
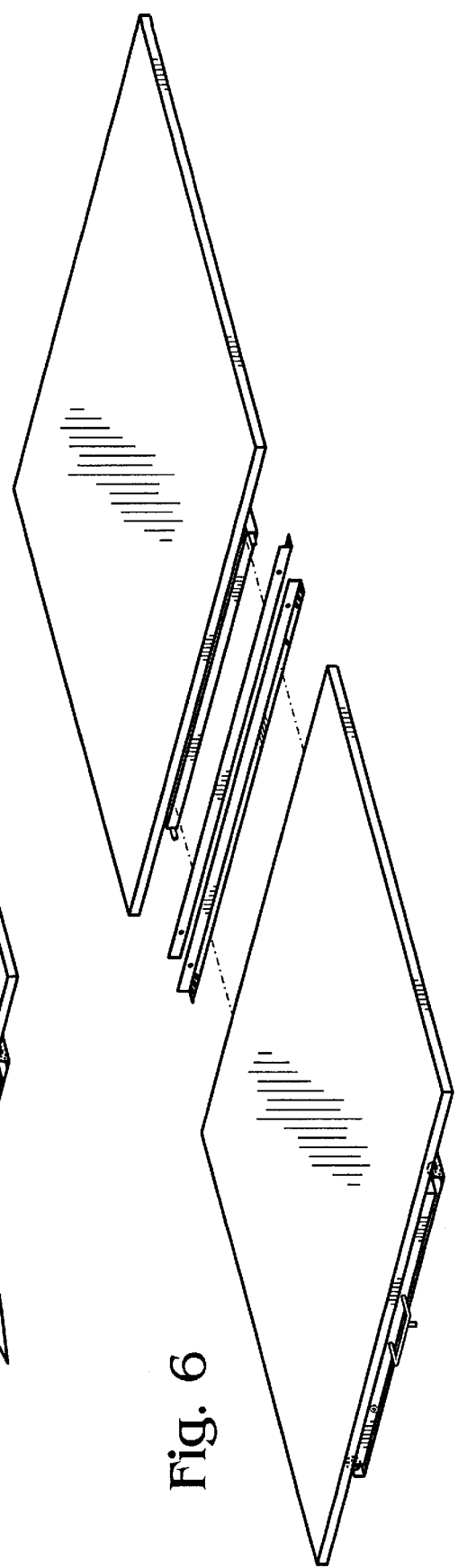
FIG. 6 is a perspective view of one embodiment of a bed slide where two slides are placed facing opposite directions back to back.
Figure 7:
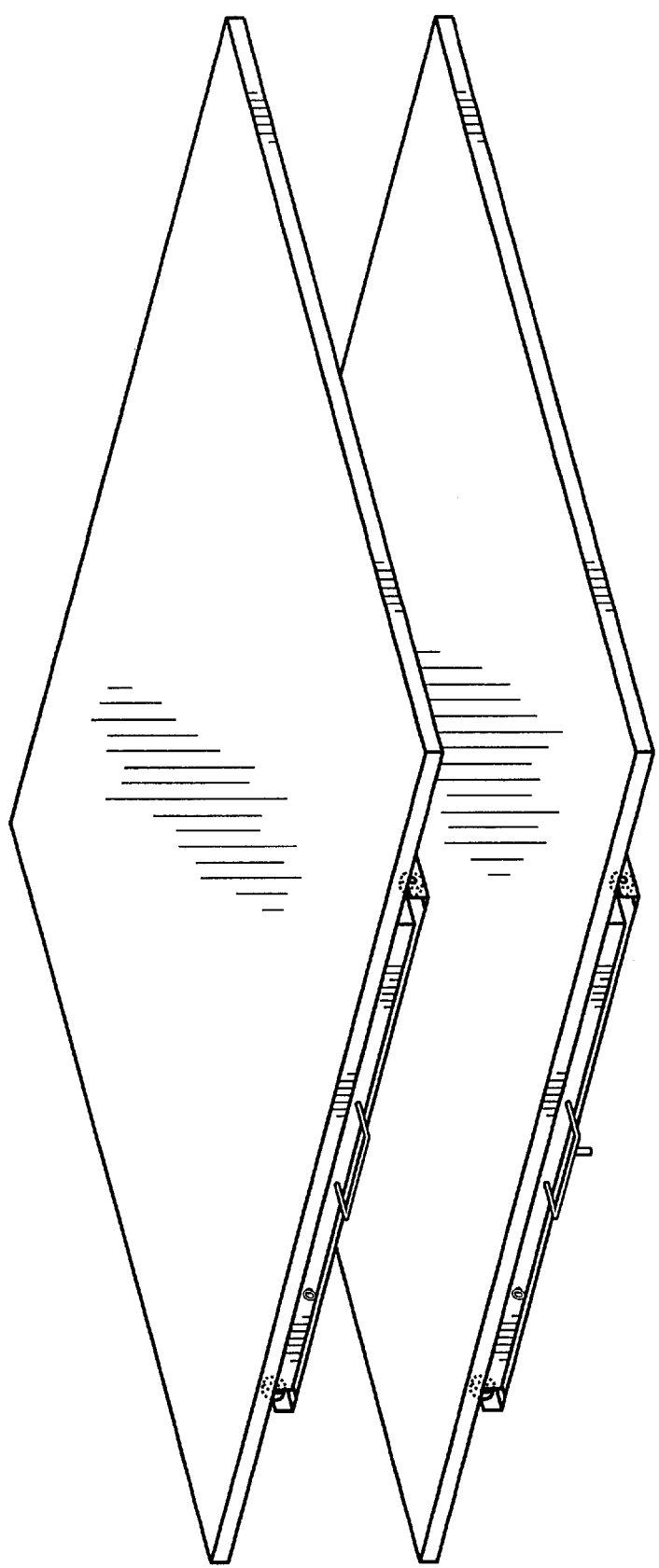
FIG. 7 is a perspective view of one embodiment of a multiple tiered bed slide.

FIG. 6 is a perspective view of one embodiment of a bed slide where two slides are placed facing opposite directions back to back. In one embodiment two slides could be placed facing opposite directions back to back. This alternative embodiment could thus give two independent bed slides and provide access to either side of a storage compartment with openings at two opposite ends. FIG. 7 is a perspective view of one embodiment of a multiple tiered bed slide. In another embodiment, a multiple tiered bed slide can also be provided with telescoping properties by attaching one or more bed slides on top of each other.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A vehicle bed slide comprising:

a bottom frame having a plurality of pegs to be inserted into holes in a storage area of a vehicle, wherein said bottom frame is maintained within said storage area by the pegs extending into corresponding holes in said storage area without a securing device attached to the pegs on an outer side of the storage area, wherein at least one of the pegs to extend into a substantially vertical portion of the storage area and at least one of the pegs to extend into a substantially horizontal portion of the storage area; and a top portion to slideably connect to said bottom frame.

2. The vehicle bed slide of claim 1 wherein said storage area of said vehicle comprises a truck bed.

3. The vehicle bed slide of claim 1 wherein multiple bottom frame and top portion pairs are attached together to form a multiple tiered extension slide.

4. The vehicle bed slide of claim 1 wherein said top portion can be locked in positions between full extension and full contraction.

5. The vehicle bed slide of claim 1 wherein said storage area comprises a cargo bay of an SUV.

6. The vehicle bed slide of claim 1 wherein said storage area comprises a cargo bay of a van.

7. The vehicle bed slide of claim 1 wherein said storage area comprises a cargo bay of a station wagon.

8. A vehicle bed slide comprising:

a bottom frame to attach to a storage area of a vehicle; and a top portion to slideably connect to the bottom frame;

wherein said bottom frame is attached to said storage area and attached to an auxiliary frame that is attached to the storage area, the bottom frame attached to the auxiliary frame and to the storage area by peg portions of said bottom frame extending into corresponding holes in said storage area and said auxiliary frame without securing devices attached to the peg portions on an outer side of the storage area and the auxiliary frame.

9. The vehicle bed slide of claim 8 wherein said storage area of a vehicle is a truck bed.

10. The vehicle bed slide of claim 8 wherein said storage area of a vehicle is a storage compartment to a recreational vehicle.

11. The vehicle bed slide of claim 8 wherein storage area of a vehicle is a storage compartment of a van.

12. The vehicle bed slide of claim 8 further comprising:

a second bottom frame; and a second top portion to slideably connect to said second bottom frame;

wherein said second bottom frame is attached to said storage area and said auxiliary frame by peg portions of said second bottom frame extending into corresponding holes in said storage area and said auxiliary frame.

13. The vehicle bed slide of claim 8 further comprising:

a second bottom frame;

a second top portion slideably connected to said second bottom frame;

wherein said storage area has a first opening and a second opening; and wherein said second bottom frame is attached to said top portion facing said second opening.

14. The vehicle bed slide of claim 8 wherein multiple bottom frame and top portion pairs are attached together to form a multiple tiered bed slide.

15. The vehicle bed slide of claim 1 wherein said storage area comprises a storage compartment to a recreational vehicle.

16. The vehicle bed slide of claim 8 wherein storage area of a vehicle is a storage compartment of a station wagon.

17. The vehicle bed slide of claim 8 wherein said top portion comprises:

a sheet of plywood with a carpeted top; and steel angle iron bordering.

* * * * *